United States Patent

Hart et al.

[11] Patent Number: 5,207,482
[45] Date of Patent: May 4, 1993

[54] VENT VALVE DEVICE HAVING DISABLING MEANS

[75] Inventors: James E. Hart, Trafford; Williard P. Spalding, Pittsburgh, both of Pa.

[73] Assignee: Westinghouse Air Brake Company, Wilmerding, Pa.

[21] Appl. No.: 737,103

[22] Filed: Jul. 29, 1991

[51] Int. Cl.$^5$ ............................................. B60T 11/34
[52] U.S. Cl. ......................................... 303/33; 303/82; 303/86; 303/57
[58] Field of Search .................. 303/82, 83, 86, 33–40, 303/42, 57, 66, 69

[56] References Cited

U.S. PATENT DOCUMENTS

| | | | |
|---|---|---|---|
| 1,877,554 | 9/1932 | Bushnell | 303/42 |
| 4,025,126 | 5/1977 | Wilson | 303/33 |
| 4,043,604 | 8/1977 | Hart | 303/33 |

Primary Examiner—Robert J. Oberleitner
Assistant Examiner—Lee W. Young
Attorney, Agent, or Firm—G. J. Falce

[57] ABSTRACT

A railway car vent valve device having a bleed valve that is selectively operable to disable the vent valve device during a single car test procedure in which the service stability of the car control valve is checked. The bleed valve is automatically reset when the car brake pipe pressure drops below a predetermined value, such as occurs when the single car test apparatus is disconnected from the car brake pipe following completion of the single car test procedure.

16 Claims, 2 Drawing Sheets

VENT VALVE DEVICE HAVING DISABLING MEANS

BACKGROUND OF THE INVENTION

This invention relates to vent valve devices and particularly to a means for temporarily disabling a vent valve device when conducting a single car test in accordance with the new single car test procedure specified by the A.A.R. (Association of American Railroads) for checking the general condition of the brake system of "in date" railway freight cars and cars having undergone "periodic repairs". A single car test device enables this test procedure to be accomplished without removal of any of the air brake components from the car.

In one phase of this test procedure, referred to as the service stability test, the car control valve is checked to assure that it does not go to emergency during a service rate of reduction of brake pipe pressure. Typically, this test was performed satisfactorily without having to isolate the car vent valve device, when equipped with such. Recently, a revised single car test procedure was instituted, however, for carrying out the service stability test for control valves on long cars having over 75 feet of brake pipe. Essentially this revision of the test procedure requires a faster rate of brake pipe pressure reduction, which causes the car vent valve device to fire. In order to prevent the vent valve from influencing the rate of brake pipe pressure reduction, when inadvertently actuated during the new single car test, the vent protector was removed and reinstalled in the vent valve exhaust port in its closed position to block the exhaust of brake pipe pressure. In the industry standard #8 and KM-2 vent valves, this proved to be an effective means of preventing an actuated vent valve from dumping brake pipe pressure and thereby adversely affecting the service stability test.

In attempting to employ this same procedure with the recently developed VX Vent Valve disclosed in U.S. Pat. No. 4,974,911, it was found that even with the vent valve exhaust port plugged, a sudden 1 psi drop in brake pipe pressure still occurs, due to the particular design of the exhaust valve diaphragm causing relatively high volumetric displacement when the vent valve is fired. While this brake pipe pressure drop is beneficial in terms of transmitting an emergency application in actual operation, it adversely affects the control valve stability during the new service stability test.

SUMMARY OF THE INVENTION

In accordance with the foregoing, it is the object of the present invention to provide a means of selectively disabling a vent valve device that is low in cost, reliable in operation, and requires no tools to activate.

Another object of the invention is to provide a vent valve disabling mechanism that is automatically reset when brake pipe pressure is reduced below a predetermined value.

Briefly, these objectives are achieved in a vent valve device for locally venting a railway car brake pipe when an emergency rate of reduction of the fluid pressure carried in the brake pipe is initiated comprising a housing having an inlet port to which the brake pipe is connected, a vent port, a first chamber connected to the inlet port, and a second chamber, flow restrictor means between the first and second chambers for controlling the rate at which fluid pressure is released from said second chamber in response to a reduction of said brake pipe pressure to thereby establish a predetermined pressure differential between said first and second chambers when said brake pipe pressure is reduced at an emergency rate, piston valve means for establishing fluid pressure communication between the inlet port and vent port in accordance with a predetermined pressure differential being established between the first and second chambers and selectively operable disabling means for releasing fluid under pressure from said second chamber in parallel with said flow restrictor means to prevent such predetermined pressure differential between the first and second chambers from being established during the single car test procedure.

BRIEF DESCRIPTION OF THE DRAWINGS

Other objects and attendant advantages of the invention will become apparent from the following, more detailed explanation of a preferred form of the invention when taken with the accompanying drawings in which.

DESCRIPTION AND OPERATION

Figure 1:
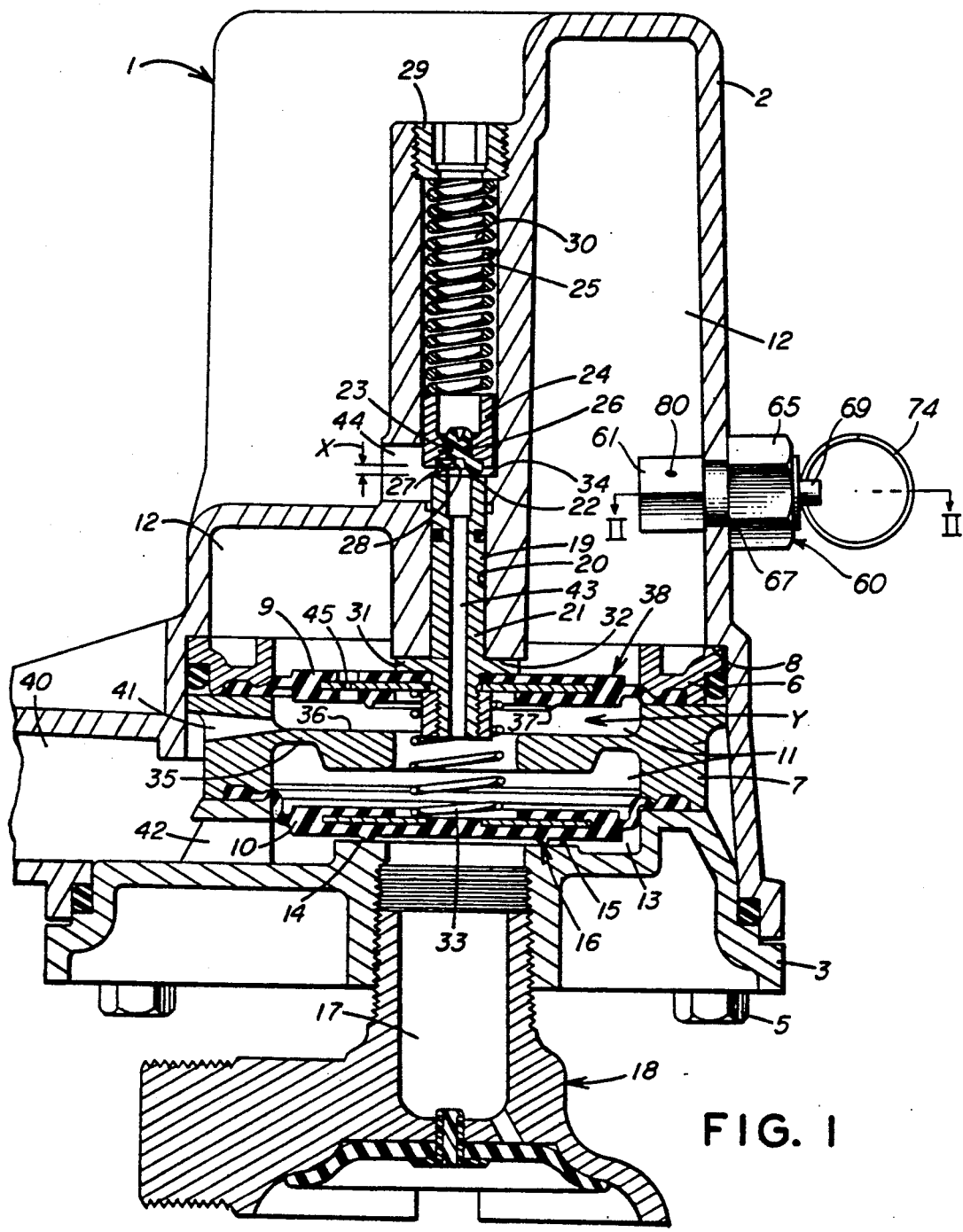
FIG. 1 is an elevation assembly view in section showing a vent valve device incorporating a manually actuable bleed valve device in accordance with the present invention.

Vent valve device 1 comprises preferably a die cast housing including a body portion 2 and a cover portion 3 that closes an opening at one end of body portion 2 through which the majority of the valve components may be installed. Cover portion 3 is held in place by bolts 5 and, in turn, retains a pair of diaphragm clamping plates 6, 7 in place against a shoulder 8 of body portion 2. A control piston 9 in the form of an elastomeric diaphragm member is clamped at its outer periphery between clamping plates 6, 7 and a vent valve piston 10 in the form of a similar elastomeric diaphragm member is clamped at its outer periphery between clamping plate 7 and cover portion 3.

Formed between piston members 9 and 10 is a pilot chamber 11, the bounds of which are delineated by clamping plate 7. On the upper side of diaphragm member 10 opposite pilot chamber 11 is a control chamber 12 delineated by clamping plate 6 and body portion 2. On the under side of diaphragm member 10 opposite pilot chamber 11 is an actuating chamber 13 delineated by cover portion 3 and the outer periphery of an annular sealing bead 14 of diaphragm member 10 that, in conjunction with a seat 15 formed on cover portion 3, constitutes an exhaust valve 16. A vent port 17 is formed in cover portion 3 at a location within the bounds of annular sealing bead 14 and is fit with a vent protector 18.

Control piston 9 is fixed at its midpoint to a guide stem 19 that is disposed in a bore 20 formed in a projection 21 of body portion 2. One end 22 of stem 19 projects through bore 20 for operating a pilot valve 23 comprising a movable valve cartridge 24 that is disposed in a counterbore 25 of bore 20. Carried by valve cartridge 24 is a valve element 26 having an annular sealing bead 27 that is engageable with a valve seat 28 provided by the projecting end 22 of stem 19. Compressed in counterbore 25 between valve member 24 and a threaded plug 29 that closes counterbore 25 is a spring 30.

An outturned flange 31 of stem 19 is adapted to engage a stop 32 provided by projection 21 to establish the upwardmost position of diaphragm member 9. A spring 33 is positioned between diaphragm members 9 and 10 in order to bias diaphragm member 9 toward its upwardmost position, while biasing diaphragm member 10 in the opposite direction to a position in which sealing bead 14 of exhaust valve 16 is engaged with its seat 15.

The length of stem 19 is such that when flange 31 of stem 19 is engaged with stop 32, end 22 of stem 19 hold valve member 24 of pilot valve 23 a predetermined distance X away from a stop 34 formed at the base of counterbore 25. In this position, spring 30 is effective to provide a force sufficient to assure positive engagement of sealing bead 27 with seat 28, while concurrently stop 32 limits the potentially high fluid pressure forces acting on diaphragm member 9 to a value corresponding to the load of spring 30, to thereby prevent undue wear and/or damage to sealing bead 27.

An inturned flange 35 of clamping plate 7 provides a seat 36 with which an annular sealing bead 37 on the under side of diaphragm member 9 is engageable, seat 36 and sealing bead 37 constituting a cut-off valve 38. When diaphragm member 9 is in its upwardmost position, sealing bead 37 is displaced from seat 36 a distance Y that is greater than the distance X that valve member 24 is displaced from its stop 34.

Adapted to be connected to a branch pipe of the train brake pipe by a pipe flange (not shown) is a port 40 that is communicated with pilot chamber 11 via a passage 41 and with actuating chamber 13 via a passage 42.

Extending through guide stem 19 is a central passage 43 that communicates pilot chamber 11 with an exhaust passage 44 via pilot valve 23. A "breather" choke 45 is preferably provided in piston member 9, as shown, but may be alternatively located in clamping plate 6 in order to provide a restricted flow communication between control chamber 12 and brake pipe port 40. The restriction provided by choke 45 prevents the air in control chamber 12 from being reduced at the same rate as brake pipe pressure is reduced in pilot chamber 11. The size of this choke restriction is chosen so that the "breathing" of control chamber air via this choke will prevent a pressure differential across pilot piston 38 sufficient to open pilot valve 23, except in response to an emergency rate of reduction of brake pipe pressure.

Affixed to the vent valve body portion 2 is a bleed valve device 60 having a square-shaped plug member 61 in which is formed a blind bore 62. A mounting hole 63 is drilled or otherwise formed in the vent valve body portion in the area of control chamber 12 to receive plug member 61. A threaded end 64 of plug member 61 is inserted through hole 63 from the chamber 12. A clamp nut 65 is threaded onto the threaded end 64 to draw a shoulder 66 of plug member 61 up tight against the inside surface of body portion 2, as the clamp nut is tightened against the outer surface of body portion 2. A seal ring 67 is provided between the clamp nut 65 and outer housing surface, which preferably is spot faced to provide a flat on the generally cylindrical surface of body portion 2, against which seal ring 67 is compressed to prevent the escape of air from chamber 12 via the bleed valve mounting hole.

Operably disposed within blind bore 62 is a piston valve 68 having an actuating stem 69 that projects through an opening 70 in clamp nut 65. Fitted on the projecting end of actuating stem 69 is an O-ring 71 and washer 72. A hole 73 in stem 69 receives a pull ring 74 that retains washer 72 on stem 69, while at the same time providing the means by which bleed valve device 60 may be manually actuated. Retaining washer 72 provides a bearing surface by means of which O-ring 71 is clamped against a recess 75 surrounding opening 70 in clamp nut 65 to seal bore 62 from the elements of the environment in the de-actuated condition of bleed valve device 60.

A spring 76 is disposed in bore 62 between clamp nut 65 and the head 77 of piston valve 68 to normally maintain piston valve 68 in a cutoff position in which a pair of O-rings 78, 79 on head 77 are located on opposite sides of a radial inlet passage 80 in body portion 61. A central passage 81 in actuating stem 69 opens at one end into an actuating chamber 82 formed between head 77 and the end of blind bore 62, while the other end of central passage 81 is connected by an orifice restriction 83 to the surface of stem 69 on the side of O-ring 71 opposite washer 72. A shoulder 84 on stem 69 provides a stop that engages clamp nut 65 at opening 70 in the actuated position of piston valve 68.

It will be understood that prior to charging, i.e., in the absence of any air pressure at port 40 of vent valve device 1, spring 33 establishes closure of vent valve 16 by reason of its biasing action on vent valve piston 10, while at the same time urging control piston 9 in an upward direction. The opposing force of spring 30, however, being greater than that of spring 33, forces pilot valve member 24 to move distance X into engagement with stop 34. This, in turn, forces flange 31 of stem 19 away from stop 32. Once valve member 24 engages stop 34, spring 30 becomes caged and, in effect, supports the upward-acting force of spring 33 on piston member 9. Consequently, piston member 9 is positioned so that flange 31 is spaced from stop 32 a distance X. Since distance Y is greater than distance X, as previously explained, sealing bead 37 of cut-off valve 38 will be disengaged from its seat 36 to assure that cut-off valve 38 remains open to accommodate subsequent charging of the vent valve device 1, as now explained.

During charging in normal service operation of the train, compressed air from the train brake pipe is registered at vent valve port 40, from where this air is directed via passage 42 to actuating chamber 13, via passage 41 to pilot chamber 11, and via choke 45 to control chamber 12. With cut-off valve 38 open, exhaust valve 16 and pilot valve 23 closed, as above explained, pressure develops in actuating chamber 13 and pilot chamber 11 in accordance with the pressure carried in the train brake pipe. The resultant differential force on vent valve piston 10 due to its differential effective area reinforces spring 33 to maintain exhaust valve 16 closed. With bleed valve 60 in its cutoff position, the air in pilot chamber 11, in turn, charges control chamber 12 at a restricted rate via choke 45 to thereby establish an upward-acting pressure differential across control piston 9 which, in conjunction with the force of spring 33, moves control piston 9 upwardly through distance X until flange 31 engages stop 32. As this movement takes place, stem 19 forces valve member 24 off of its stop 34, further compressing spring 30. With the charging pressure forces on piston member 9 thus supported by stop 32, spring 30 is effective to establish a limited sealing force on sealing bead 28. It will be appreciated, therefore, that the potentially high forces capable of being developed on control piston 9 during charging are isolated from valve element 26 and particularly from sealing bead 27, thus protecting sealing bead 27 from premature wear and/or damage.

When charging is complete, the pressures effective in pilot chamber 11 and control chamber 12 equalize, it being understood that bleed valve 60 is normally in its de-actuated position in which venting of control chamber 12 is cut off. Control piston 9 continues to be supported by stop 34, since the force of spring 30 is insufficient to overcome the combined force of spring 33 and the pressure force on control piston 9 due to its differential pressure area.

During a service brake application, brake pipe pressure is reduced at a service rate, in a well-known manner, such reduction being registered at port 40 and consequently in pilot chamber 11. The pressure in control chamber 12 is reduced with the brake pipe pressure reduction in pilot chamber 11, but at a slower rate due to the restriction of choke 45, thereby creating a downward-acting pressure differential across control piston 9. While this pressure differential will vary with the actual service rate of reduction of brake pipe pressure, a maximum pressure differential will develop in response to a full service brake application. The resultant maximum differential pressure force acting downward on control piston 9 combined with the force of spring 30 will only be sufficient to deflect control piston 9 in a downward direction a distance X, since at this point valve member 24 picks up stop 34, thereby caging spring 30. With spring 30 caged and thus ineffective to exert a force on control piston 9, the control piston is stabilized against further downward deflection. Accordingly, closure of pilot valve 23 is maintained by continued engagement of sealing bead 27 of valve element 26 with seat 28. The differential area of vent valve piston 10 subject to brake pipe pressure in chambers 11 and 13 is such a to maintain closure of vent valve 16 by reason of sealing bead 14 having engagement with seat 15, so long as closure of pilot valve 26 is maintained, as above explained.

During an emergency brake application, brake pipe pressure is reduced at an emergency rate that is greater than the aforementioned service rate, so as to produce a pressure differential across piston member 9 that is greater than the pressure differential resulting from a service rate of reduction of brake pipe pressure. The resultant downward-acting force on piston member 9 is sufficiently greater than the force created during a service brake application, as to overcome the loss of force resulting from the caging of spring 30 when control piston 9 has been deflected distance X.

Consequently, control piston 9 continues to be deflected in a downward direction beyond distance X, thereby pulling seat 28 formed at the end of guide stem 19 away from sealing bead 27 of valve element 26, to thereby open pilot valve 23. As the pilot valve opens, air is vented directly from chamber 11 at an unrestricted rate to encourage continued downward deflection of control piston 9. As this downward deflection of control piston 9 continues through distance Y, control piston 9 assumes its emergency position in which sealing bead 37 engages seat 36 to close cut-off valve 38 and thereby isolate pilot chamber 11 from port 40 and the train brake pipe. By isolating pilot chamber 11 from the brake pipe, the air in the relatively small volume of pilot chamber 11 is vented quickly to accelerate the reduction of pressure in pilot chamber 11 acting on vent valve piston 10. This establishes a high pressure differential between pilot chamber air effective above vent valve piston 10 and actuating chamber air acting on the underside of vent valve piston 10, to overcome the bias force of spring 33 and deflect vent valve piston 10 in an upward direction.

Immediately upon such upward deflection of vent valve piston 10, exhaust valve 16 is opened by disengagement of sealing bead 14 from seat 15, thereby exposing the entire area of the underside of vent valve piston 10 to brake pipe pressure to positively establish and maintain exhaust valve 16 fully open. Accordingly, a local venting of brake pipe pressure is provided from port 40 to atmosphere via passage 42, actuating chamber 13, exhaust valve 16, vent port 17 and vent protector 18 to supplement the brake pipe pressure reduction initiated via the train brake pipe in order to hasten the emergency application through the train.

Following closure of cut-off valve 38, the pressure effective in control chamber 12 will continue to maintain control piston 9 in its downwardmost position in which pilot valve 23 is held open, while the control chamber pressure blows down via choke 45. Since the size of choke 45 is chosen to establish a predetermined pressure differential across control piston 9 during an emergency brake application sufficient to force the control piston to its emergency position, it will be apparent that the volume of control chamber 12 is selected in accordance with the chosen size of choke 45, such that the time required to blow down control chamber 12 corresponds to the time required to assure that the train comes to a complete halt.

Whenever the brake pipe pressure has been exhausted, spring 33 becomes effective to reset vent valve piston 10 and close exhaust valve 16. However, until the "blowdown" period has expired, the open pilot valve will maintain pilot chamber 11 vented, so that any attempt to recharge brake pipe pressure prematurely will result in the air under vent valve piston 10 causing exhaust valve 16 to open. Thus, any air supplied to the brake pipe is simply bypassed to atmosphere via vent protector 18. When the control chamber pressure has blown down to approximately 3 psi, control piston 9 is forced in an upward direction to open cut-off valve 38, but not sufficiently far to effect closure of pilot valve 23. During this final "blowdown" period, any air supplied to the brake pipe is vented via port 40, passage 41, the open cut-off valve, pilot chamber 11, central passage 43 in stem 19, the open pilot valve 23, and exhaust passage 44.

Following expiration of the "blowdown" period required to exhaust control chamber 12 via choke 45, spring 33 will be effective to move piston member 9 in an upward direction sufficiently to not only open cut-off valve 38, but to also close pilot valve 23 by engagement of seat 28 with sealing bead 27 of valve element 26. Vent valve device 1 is thus reset to accommodate charging of the brake pipe, as previously explained, with flange 31 being spaced from stop 32 a distance X.

Having explained the basic operation of vent valve device 1, the manner in which this vent valve device 1 may be selectively disabled, in accordance with the present invention, will now be explained. As hereinbefore mentioned, disabling vent valve device 1 when performing the single car test procedure is essential to prevent the vent valve from operating during the service stability test, due to the more stringent standards imposed by the newly mandated A.A.R. test code. In particular, a higher rate of reduction of brake pipe pressure is required by this new test code, at which rate the car control valve must remain stable as an indication of its ability to distinguish between service and emergency rates in actual service, particularly when employed in the longer modern railway cars being placed in service today.

Figure 2B:
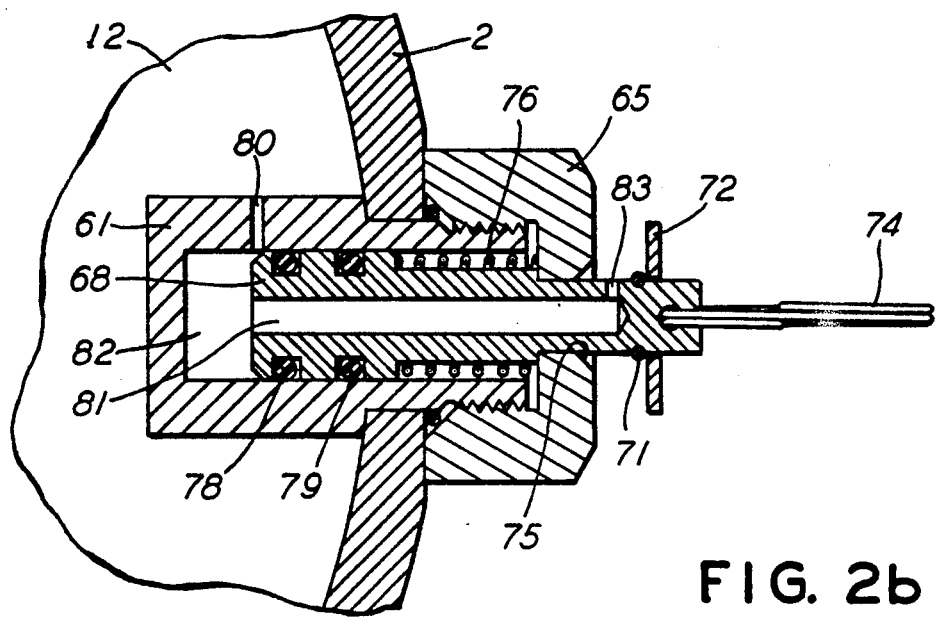
FIG. 2b is a view similar to FIG. 2a showing the bleed valve in an open position.
Figure 2A:
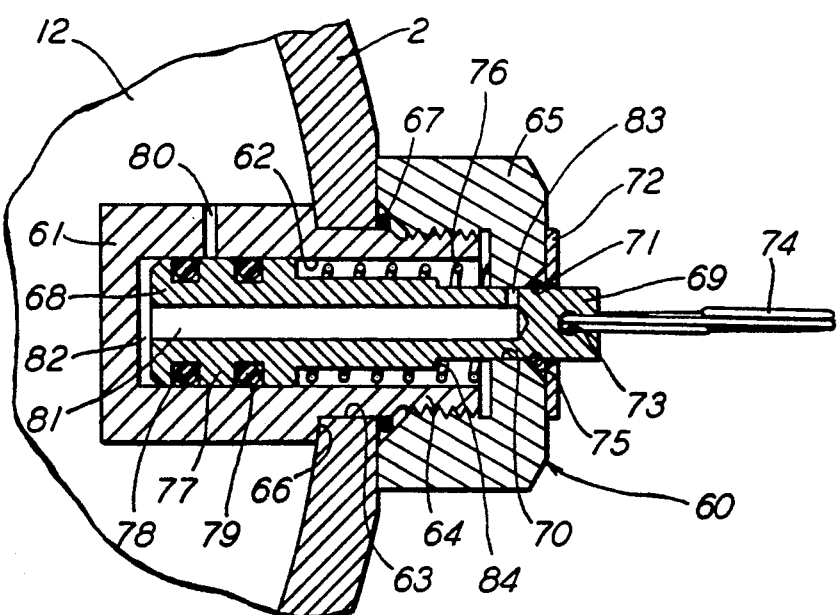
FIG. 2a is an enlarged partial sectional view taken along the section line II—II in FIG. 1 showing the bleed valve device in its normal closed position.

In performing the single car test, the test apparatus is connected by an outlet hose and hose coupling to the railway car brake pipe hose in the usual, well-known manner. The regulating valve of the single car test apparatus is then placed in handle position #1 to fully charge the car brake pipe to the desired test operating pressure. As the car brake pipe becomes charged, air is directed from vent valve port 40 to actuating chamber 13 via passage 42, to pilot chamber 11 via passage 41, and to control chamber 12 via choke 45, as previously explained relative to charging the train brake pipe during normal service operation. Bleed valve 60 is assumed to be in its normal de-actuated position, as shown in FIG. 2a. With cut-off valve 38 open, exhaust valve 16 and pilot valve 23 closed, as previously explained, pressure develops in actuating chamber 13 and pilot chamber 11, in accordance with the pressure to which the car brake pipe is charged by the single car test apparatus. The resultant differential force on vent valve piston 10 due to its differential effective area reinforces spring 33 to maintain exhaust valve 16 closed. The air in pilot chamber 11, in turn, charges control chamber 12 at a restricted rate via choke 45 to thereby establish an upward-acting pressure differential across control piston 9 which, in conjunction with the force of spring 33, moves control piston 9 upwardly through distance X until flange 31 engages stop 32. As this movement takes place, the end 22 of stem 19 engages valve member 24 to isolate the pilot chamber pressure from atmosphere.

Following completion of this charging and prior to initiating the service stability test, pull ring 74 should be manually pulled to open bleed valve 60. In pulling ring 74, actuating stem 69 is shifted axially until stop shoulder 84 engages clamp nut 65. In this open or actuated position, as shown in FIG. 2b, O-ring 78 carried on piston head 77 is shifted across radial passage 80 in body 62 to allow the air in control chamber 12 to flow into bleed valve actuating chamber 82 and thence to atmosphere via passage 81 and bleed orifice 83, which is open to atmosphere in this actuated position of stem 69.

Due to the restricted flow capacity of bleed orifice 83, pressure builds up in actuating chamber 82 and acts on the face of piston head 77 to maintain stem 69 in this actuated position against the closure force of spring 76, which is compressed between piston head 77 and clamp nut 65. Thus, the manual force on pull ring 70 may be released after only a momentary pull and the bleed valve will remain in its actuated position, as shown in FIG. 2b, until the pressure in chamber 12 and consequently in chamber 82 blows down to a predetermined level.

In this manner, the air in control chamber 12 is released at a controlled rate via bleed orifice 83. Until the service stability test is initiated, however, the air supplied via choke 45 at the appropriate test pressure will be sufficient to maintain control chamber 12 charged against the bleed of control chamber pressure via orifice 83. When the service stability test is initiated by moving the single car test apparatus regulating valve handle to a position in which a reduction of brake pipe pressure occurs at the brake pipe reduction rate specified in the new, A.A.R. mandated single car test, this bleed of control chamber pressure via orifice 83 will supplement the internal "breathing" of control chamber pressure with brake pipe pressure via choke 45. Accordingly, the brake pipe pressure reduction effective in pilot chamber 11 will be incapable of creating a pressure differential across pilot piston 9 sufficient to cause the pilot piston to open pilot valve 23. In this manner, the vent valve device 1 is disabled to prevent its inadvertent and undesirable operation during this service stability test.

Following completion of the service stability test, and re-charge of the car brake pipe preparatory to conducting further tests in accordance with the single car test procedure, bleed valve 60 should be reset. This is accomplished by pushing actuating stem 69 back to its normal closed position, as shown in FIG. 2a, in which O-rings 78 and 79 isolate radial passage 80 from bleed valve actuating chamber 82. From the time O-ring 78 crosses radial passage 80 until seal ring 71 engages recess 75 in clamp nut 65, bleed orifice 83 remains open to atmosphere to maintain actuating chamber 82 vented. This allows any residual pressure in chamber 82 to be dissipated, thereby preventing any dashpot effect from occurring, which would otherwise prevent positive reset of piston valve 68 to its cutt-off position. In thus terminating the supplemental "breathing" of control chamber pressure via bleed orifice 83, vent valve device 1 is conditioned for normal service, as hereinbefore explained.

In the event a tester performing the single car test fails, for whatever reason, to manually reset bleed valve 60 in accordance with the prescribed practice, the bleed valve will be automatically reset any time brake pipe pressure is reduced blow a predetermined value of approximately 55 psi. Normally this would occur in the course of conducting subsequent tests, but even in failing to perform such subsequent tests, would nevertheless occur when the brake pipe pressure is dumped at the time of removing the single car test device from its coupling with the car brake pipe. In either case, spring 76 is effective when the brake pipe pressure falls below this predetermined value of approximately 55 psi to force piston valve 68 to its normal closed position, as shown in FIG. 2a. In this manner, the bleed valve is assured of being closed when the car is put back into service following completion of the single car test.

It should be noted that spring 76, in resetting bleed valve 60 when brake pipe pressure drops below approximately 55 psi, also prevents accidental actuation of the bleed valve, in that a positive manual force of approximately six pounds is required to actuate piston valve 68.

It should also be noted that the opening of bleed valve 60 will have no affect on the brake pipe pressure reduction rate during the control valve stability test, since the brake pipe pressure is lower than the vent valve control chamber pressure during the test and therefore does not feed back into the control chamber 12 to support the exhaust at the bleed choke.

In accordance with the foregoing, it will be appreciated that the vent valve bleed valve 60 effectively prevents the vent valve device 1 from being inadvertently actuated during the control valve service stability test; does not influence the brake pipe reduction rate required for carrying out the stability test; is automatically re-settable; and is not susceptible to accidental operation during normal service.

We claim:

1. A vent valve device for locally venting a railway car brake pipe when an emergency rate of reduction of the fluid pressure carried in said brake pipe is initiated, comprising:
  (a) a housing having an inlet port to which said brake pipe is connected, a vent port, a first chamber communicated with said inlet port, and a second chamber;
  (b) flow restrictor means between said first and second chambers for controlling the rate at which fluid pressure is released from said second chamber in response to a reduction of said brake pipe pressure to thereby establish a predetermined pressure differential between said first and second chambers when said brake pipe pressure is reduced at an emergency rate;
  (c) piston valve means for establishing fluid pressure communication between said inlet port and said vent port in accordance with said predetermined pressure differential being established between said first and second chambers; and
  (d) disabling means selectively operable to an actuated position for releasing fluid under pressure from said second chamber to prevent said predetermined pressure differential from being established between said first and second chamber, said disabling means being automatically resettable, from said actuated position to a de-actuated position in which the release of fluid pressure from said second chamber is cut-off, when fluid pressure in said second chamber is reduced below a predetermined value.

2. A vent valve device, as recited in claim 1, wherein said disabling means comprises a manually operable bleed valve by which said second chamber is vented to atmosphere.

3. A vent valve device, as recited in claim 2, wherein said bleed valve comprises:
  (a) body fixed to said housing;
  (b) a bore in said body;
  (c) a piston valve in said bore having an actuating stem projecting from said bore externally of said housing;
  (d) a passageway between said second chamber and atmosphere, said piston valve opening said passageway in said actuated position and closing said passageway in said de-actuated position;
  (e) an actuating chamber including said passageway formed by said piston valve in cooperation with said bore; and
  (f) spring means for biasing said piston valve toward said de-actuated position.

4. A vent valve device, as recited in claim 3, wherein the bias force of said spring means is such as to force said piston valve to said de-actuated position when the fluid under pressure effective in said actuating chamber is less than said predetermined value to provide said automatic reset of said bleed valve.

5. A vent valve device, as recited in claim 4, wherein said passageway includes a first passage in said body between said second chamber and said bore, and a second passage in said stem between said actuating chamber and atmosphere.

6. A vent valve device, as recited in claim 5, wherein said piston valve includes at least one O-ring seal that lies adjacent one side of said first passage in said de-actuated position of said piston valve and on the opposite side of said first passage in said actuated position.

7. A vent valve device, as recited in claim 6, wherein said piston valve includes a second O-ring seal that lies adjacent said opposite side of said first passage in said de-actuated and said actuated positions.

8. A vent valve device, as recited in claim 6, wherein said second passage includes a fluid flow restriction.

9. A vent valve device, as recited in claim 6, wherein said second passage opens to said bore in said deactuated position of said piston valve and opens to atmosphere in said actuated position of said piston valve, said actuating stem having a third O-ring seal between said opening of said second passage to said bore and atmosphere in said de-actuated position of said piston valve.

10. A vent valve device, as recited in claim 9, further comprising a pull ring affixed to said actuating stem.

11. A vent valve device, as recited in claim 10, further comprising a retaining ring on said actuating stem between said pull ring and said third O-ring seal.

12. A vent valve device, as recited in claim 3, wherein said housing includes an opening in which said bleed valve is disposed between said second chamber and atmosphere.

13. A vent valve device, as recited in claim 12, wherein said body comprises:
  (a) a plug member in which a first segment of said bore is formed, including:
    1. a head portion;
    2. a threaded portion sized to pass through said opening; and
    3. a neck portion intermediate said head and threaded portions forming a shoulder therebetween with which the interior of said housing is engageable in surrounding relationship with said opening such that said threaded portion projects externally of said housing; and
  (b) a nut member threadedly engaged with said threaded portion of said plug member, said nut member engaging the exterior of said housing in surrounding relationship with said opening to clamp said body to said housing.

14. A vent valve device, as recited in claim 13, wherein said nut member further comprises a second segment of said bore through which said actuating stem projects.

15. A vent valve device, as recited in claim 14, further comprising a seal ring between the exterior of said housing and the confronting surface of said nut member in surrounding relationship with said opening.

16. A vent valve device, as recited in claim 15, wherein said housing forming said control chamber is cylindrical in shape such that the exterior of said housing is generally curved, the area of said exterior surrounding said opening being flat.

* * * * *